United States Patent Office 3,129,374
Patented Apr. 14, 1964

3,129,374
SEMICONDUCTOR PROTECTION CIRCUIT
Alfred E. Relation, Monroeville, Rudy P. Putkovich, Franklin Township, Westmoreland County, and Thomas M. Corry, Monroeville, Pa., assignors to Westinghouse Electric Corporation, East Pittsburgh, Pa., a corporation of Pennsylvania
Filed Dec. 7, 1960, Ser. No. 74,388
18 Claims. (Cl. 321—14)

This invention relates generally to control circuit means for controlling the conductivity of semiconductor devices and is particularly adapted among other uses for protecting semiconductor switches of an electrical inverter network.

An object of this invention is to provide a new circuit for controlling the conductivity of semiconductor devices.

Another object of the invention is to provide means for terminating conduction of semiconductor devices at preselected periods.

A still further object of the invention is to provide a new and improved control device for an electrical inverter.

A still further object of this invention is to provide such a control device that will shut down the further inverter operation upon the occurrence of a predetermined undesired operating condition.

A still further object of the invention is to provide an L-type inverter circuit with a circuit which will terminate conduction of the inverter circuit solely at a fixed condition of operation of the inverter circuit.

Figure 1:
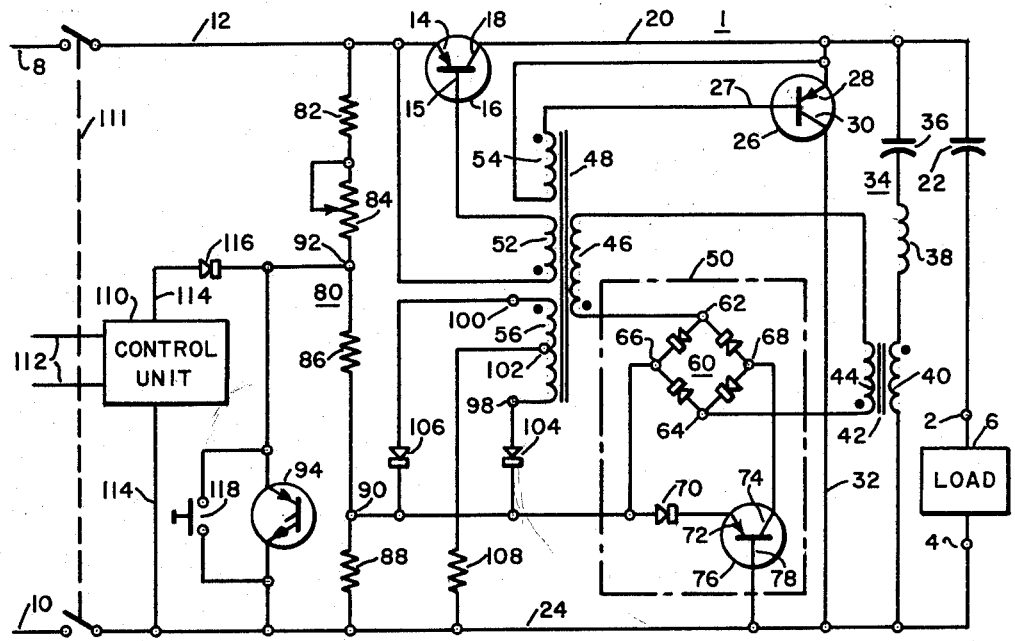
Figure 2:
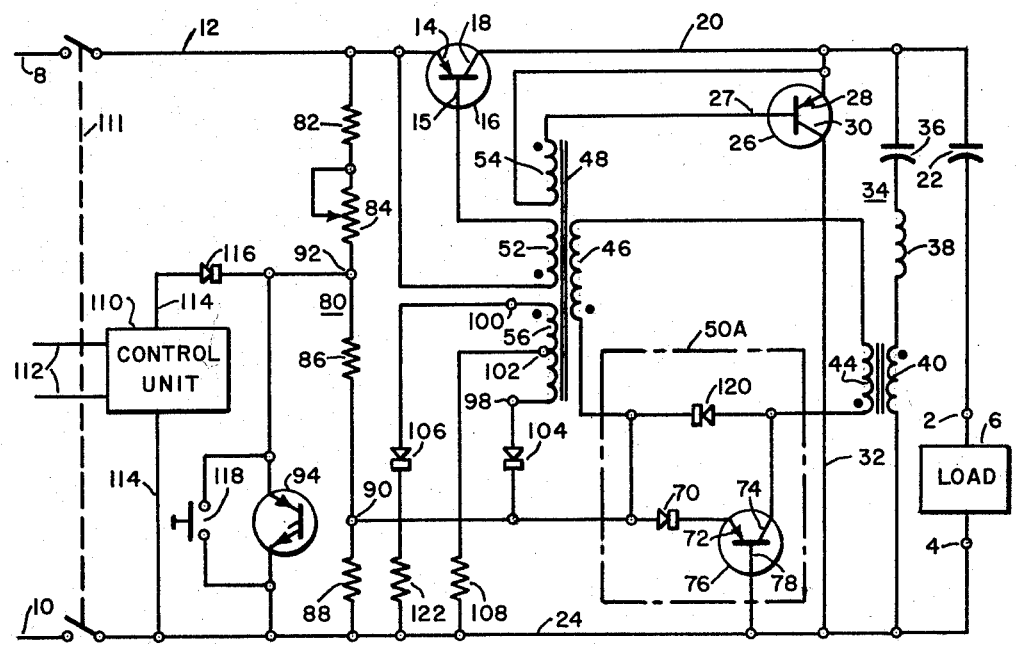

Other objects of the invention will be apparent from the specification, the hereinafter appended claims and the drawings in which:

FIGURE 1 is a schematic circuit diagram embodying one form of the invention; and FIG. 2 is a schematic diagram illustrating a modified form of the invention.

Referring to the drawings by characters of reference the numeral 1 designates generally an L-type inverter network having output terminals 2 and 4 connected to energize a load device 6. The network 1 is energized from a pair of input terminals 8 and 10 which may be supplied from any suitable source of unidirectional potential. A conductor 12 connects the input terminal 8 to the emitter 14 of a first transistor 16, the collector 18 of which is connected by conductor 20 through a load capacitor 22 to the output terminal 2. The other input terminal 10 is connected by means of a conductor 24 directly to the output terminal 4. A second power transistor 26 has its emitter 28 connected to the conductor 20 and its collector 30 connected by means of conductor 32 to the bus 24.

In order that the transistors 16 and 26 may be alternately rendered conducting at a predetermined rate, a resonant control circuit 34 is provided. This circuit is connected between the conductors 20 and 24 and comprises a capacitor 36 series connected with an inductor 38 and the primary winding 40 of a control transformer 42. The secondary winding 44 of the transformer 42 is connected across the primary winding 46 of control transformer 48 through a switch device 50. The transformer 48 is provided with secondary windings 52, 54 and 56. The winding 52 is connected between the base 15 and emitter 14 of the transistor 16 while the winding 54 is connected between the base 27 and the emitter 28 of the transistor 26.

The switch device 50 comprises a bridge type, full wave rectifying network 60 having alternating current terminals 62 and 64 connected in series with the series connected windings 44 and 46 of transformers 42 and 48, respectively. The network 60 is provided with direct current terminals 66 and 68 which are connected together through a rectifier 70 and the main circuit comprising the emitter 72 and collector 74 of control transistor 76. It will be appreciated that when the main circuit of the transistor 76 conducts, the transformer 44 is enabled to energize the transformer 46 and conversely.

Conduction of the control transistor 76 is controlled by the control voltage appearing between its emitter 72 and its base 78. For this purpose, a potential divider 80 is provided. The potential divider 80 comprises a plurality of series connected resistors 82, 84, 86 and 88 which are connected between the buses 12 and 24. The potential divider 80 is provided with a first terminal 90 which is intermediate the resistors 86 and 88 and a second terminal 92 intermediate the resistors 84 and 86. The emitter 72 of transistor 76 is connected through the rectifier 70 to the terminal 90 while the base 78 of the control transistor 76 is connected through the bus 24 to the resistor 88. The magnitude of the resistor 88 is small with respect to the magnitude of the resistor 86 for a purpose which will be rendered clear as the description continues. It will be appreciated that the terminal 90 is normally maintained slightly positive with respect to the bus 24 whereby the transistor 76 is normally maintained in a conducting condition.

In order to render the control transistor 76 non-conductive, a breakover device 94 is connected between the terminal 92 and the bus 24. The breakover device 94 may be a device commonly sold under the mark Dynistor and which is a semiconductor device that acts as an open circuit at all voltages thereacross less than a predetermined voltage and which upon being subjected to a voltage greater than the predetermined voltage breaks down and continues to conduct until such time as the current therethrough falls below a predetermined minimum at which time the breakover device 94 again becomes non-conductive and remains non-conducting until it is again subjected to a voltage greater than the predetermined breakdown voltage. Preferably, the breakdown device 94 is so chosen with respect to the values of the resistors 82, 84, 86 and 88 and to the voltage supplied between the input terminals 8 and 10 that the voltage normally appearing between the terminal 92 and the bus 24 is slightly less than the predetermined voltage at which the device 94 breaks over.

When the voltage between the terminals 8 and 10 increases, for any reason whatsoever, sufficiently to cause the voltage appearing between the terminal 92 and the bus 24 to exceed the breakover voltage of the breakover device 94 it breaks over and conducts. Conduction of the breakover device 94 causes the potential of the terminal 92 to be lowered substantially to that of the bus 24. Since the value of the resistor 86 is substantially greater than the value of the resistor 88, conduction of the breakover device 94 lowers the potential of the terminal 90 to substantially that of the bus 24 and further conduction of the control transistor 76 due to the potential drop across the resistor 88 is thereby prevented.

The breakover device 94 can breakover at any portion of the operating cycle of the inverter network and since it is believed desirable to stop the inverter operation only at certain portions of the cycle of the network means is provided to maintain transistor 76 conducting until such cycle portions are reached even though the breakover device 94 has broken over. This prevents indiscriminate interruption and insures interruption at a condition in which the inverter circuit is capable of supporting twice the input voltage.

In order to terminate conduction through transistor 76 only when the current flow through one of the transistors 16 or 26 is of minimum value, the termination occurs when the resistor 88 is maintained energized from the secondary winding 56 of the control transformer 48. This winding 56 is provided with a pair of end terminals 98, 100 and an intermediate terminal 102 which may be electrically equidistant from the terminals 98 and 100. The terminals 98 and 100 are individually connected through rectifiers 104 and 106 respectively to the terminal 90 while the intermediate terminal 102 is connected through a resistor 108 to the bus 24. When the transformer 42 is energized as will occur except at the instances of zero current in the oscillating circuit 34, a voltage will be established across the resistor 88 separate and apart from the voltage normally established thereacross from the terminals 8 and 10 to maintain the potential of the terminal 90 above that of the bus 24 and transistor 76 will continue to conduct irrespective of the operation of the breakover device 94. When the current in the control circuit 34 goes to zero, the transformer 42 becomes deenergized and is no longer effective to energize the resistor 88. Since the device 94 has brokenover, the voltage supplied to the resistor 88 from the conductors 12 and 24 terminates and the control switch 50 cannot again be closed and the transformer 48 remains deenergized.

Further details of construction may best be understood by a description of the operation of the inverter network. Closure of the disconnect switch 111 connects the buses 12 and 24 to the input terminals 8 and 10. When this occurs the transistor 16 will commence to conduct slightly. This causes current to flow through the resonant circuit in a direction to charge the capacitor 36 causing current to flow through the transformers 42 and 48 in a direction to cause the transistor 16 to increase its conduction and to cause the transistor 26 to decrease its conduction. This results in a greater current flow through the resonant circuit 34 and a still further opening of the transistor 16 and closing of the transistor 26. Before long, the current in the resonant circuit 34 will reverse to cause a reversal of current through the control transformer 48. This reverses the polarity of the voltage supplied the control windings 52 and 54 to terminate further conduction of the transistor 16 and to initiate current flow through the transistor 26. With the transistor 16 non-conductive and the transistor 26 conducting, current will flow from the load capacitor 22 through the transistor 26, conductor 32, bus 24, terminal 4, load 6, terminal 2 back to the other side of the capacitor 22.

Eventually the current through the resonant circuit 34 reverses to reverse the output polarity of the transformers 42 and 48 whereby the transistor 16 will conduct and transistor 26 will be held non-conductive. Conduction of transistor 16 again causes current to flow from the input terminal 8 through the buses 12 and 20 and through the capacitor 22 to the load 6; current returning from the load 6 through the bus 24 to the negative terminal 10 of the unidirectional potential supply. The oscillation network 34 continues to oscillate and alternately render the transistors 16 and 26 conducting to cause current to oscillate back and forth through the load 6 as described until such time as the disconnect switch 111 is opened or until the breakdown device 94 breaks down to terminate further current flow.

As described heretofore the operation of the inverter network 1 may be interrupted at the end of a conductive period of the transistor 16 or 26 upon the breakdown of the breakover device 94 and the inverter operation will only terminate, due to the feedback function of the transformer winding 56, at the time the current flow through the transistors 16 or 26 is at or substantially at its minimum value. It is contemplated that the potential between terminal 92 and the base 24 may be raised above the critical breakdown value in response to the occurrence of any selected signal. This, as discussed above, may be due to a rise in potential between the input terminals 8 and 10 or may additionally be caused by actuation of a control unit 110 having input leads 112 and output leads 114 connected across the breakover device 94. Preferably a rectifier 116 is provided in this connection to prevent feedback into the control unit 110. The control unit 110 acts in response to an input signal to raise the potential between its output leads 114 sufficiently to cause the breakover device 94 to breakdown. Thus, the unit 110 could be actuated in response to excessive load current, temperature, or merely a foreign signal as desired.

Since the breakover device 94 is such that it will continue to conduct after breakover until the current therethrough is reduced below a critical value, a reset switch 118 is provided. The switch 118 is connected in shunt with the device 94 and closure thereof completes a low resistance shunt path about the breakover device 94 which will reduce the current flow through the device 94 below the critical value necessary to maintain breakover and the device 94 will reset. If upon reopening of the reset switch 118, the fault has cleared and the voltage between the terminal 92 and the bus 24 is below the predetermined voltage at which the device 94 breaks over, the device 94 will remain non-conductive and the potential dividing network 80 will maintain the potential of its terminal 90 sufficiently elevated above the negative bus 24 to cause the control transistor 76 to conduct whereby the switch 50 is closed to permit energization of the control transformer 48 and operation of the inverter network 1.

The switch 50A of FIG. 2 omits the full wave rectifier bridge 60 found in the switch 50. Switch 50A as described above, controls current flow in the half cycle of the output polarity of the transformer 42 which is effective to fire the transistor 16 leaving the current flow in the other half cycle uncontrolled. This arrangement permits termination of the inverter operations solely at the beginning of the half cycle of the output voltage which occurs when transistor 26 starts to conduct. As will be shown below this provides the minimum voltage drop across the transistor 16 and a more positive assurance that the transistor 16 will maintain the power circuit open. The windings 44 and 46 in the embodiment of FIG. 2 are series connected through the emitter 72 and collector 74 of the transistor 76 and through the rectifier 70 in the shown polarity. A rectifier 120 is shunt connected across the series connected transistor 76 and rectifier 70 to pass current in the half cycle of the oscillating current which fires the transistor 16. Since energization of the transformer 48 in a potential necessary to maintain transistor 16 conducting is due to conduction through the rectifier 120 and there is no need to maintain the resistor 88 energized to insure conduction of the transistor 76 and consequently the terminal 100 of the winding 56 may be connected through the rectifier 106 directly to the bus 24 instead of through resistor 88. In order to balance the current flow through winding 56, a resistor 122 is provided.

With this arrangement it will be apparent that operation of the inverter will be terminated only at one point in the inverter cycle. This point will be always at minimum current flow through the transistor 16. As illustrated the interrupter will occur immediately after a conductive period of the transistor 16 and prevent the subsequent conduction of the transistor 26. The illustrated arrangement is the most desirable since under these conditions the voltage established across the load capacitor 22 is in a polarity to the supply voltage across the terminals 8 and 10 and a minimum voltage will appear across the transistor 16. Eventually the charge may leak from the capacitor 22 so that the potential across the transistor 16 increases but this can never exceed the voltage across the terminals 8 and 10.

If the polarities within the switch 50A were reversed, the inverter would cease operation immediately upon termination of conduction of transistor 26 with the terminal of the load capacitor 22 which is connected to the collector 18 negative with respect to the terminal thereof connected to bus 24 whereby a voltage substantially greater than the voltage applied to the terminals 8 and 10 will appear across the transistor 16. In most cases this would be undesirable and it is preferred to use the polarities as first described in which termination of the inverter operation occurs at the end of the conductive period of transistor 16.

It is believed that the operation of the form of the invention illustrated in FIG. 2 will be apparent from the descriptions given and no further detailed explanation is believed necessary.

While the invention is described and illustrated in connection with L-type inverter networks and in connection with transistor switches therein, it will be apparent that this arrangement is more broadly useful and may be applied not only to bridge and push-pull type inverter circuits but may be applied to any type of semiconductor control circuit in which the semi-conductors are alternately rendered conducting. Further, while this invention has been described in connection with transistors semiconductors of the transistor type it will be apparent that it is also applicable for use with controlled devices as for example controlled rectifiers (PNPN semiconductor devices).

What is claimed and is desired to be secured by the United States Letters Patent is as follows:

1. In a switching network for controlling flow of electrical energy, a first current flow controlling device having a main circuit and a control circuit operable upon being energized to render said main circuit conductive, an energizing network having a first output connected to said control circuit, said network including a second current flow controlling device, said second current device having a main current path operably connected to control the energized condition of said first output, said second current device having a pair of energizable electrodes operable to control the energized condition of said main current path, said network being arranged to energize said first output and thereby render said control circuit effective to initiate current flow through said main circuit in response to a first operating condition of said second current device, first circuit means connected to said energizable electrodes and normally effective to maintain said electrodes in a first energized condition whereby said second current device is placed in its said first operating condition, means for rendering said first circuit means ineffective to maintain said electrodes in their first energized condition, and second circuit means connected to said energizable electrodes and effective to maintain said electrodes in their said first energized condition to maintain current flow in said main path irrespective of the rendering of said first circuit means ineffective.

2. A control network for an electric switch which is controlled by energizing a pair of switch controlling terminals, a network having an output circuit connected to said terminals and having an input circuit energized as a consequence of the passage of current through said switch, said network including a valve device having a control circuit energized from said input circuit for controlling the conduction of said valve device, said valve device having a controlled circuit for controlling the energization of said terminals, first means normally maintaining said valve device in a first conductive condition, second means operable to render said first means ineffective, and third means actuated as a consequence of current flow through said switch for maintaining said valve device in its said first conductive condition irrespective of the operation of said second means.

3. A protective circuit for a continuous control type of a semiconductor device having a power path and a control circuit, a control network having input terminals energized as a consequence of power flow through said power path, said network having output terminals connected to said control circuit, said network including a semiconductor valve having a main power path and a control power path, said main power path being operatively connected to said output terminals whereby the conductive conduction of said main power path determines the energized condition of said output terminals and thereby the conductive condition of said semiconductor device, first actuating means connected to said control path and normally effective to actuate said control path into a condition to maintain said main path in a conductive condition, means including a pair of terminals operatively connected to said control path said last named means being effective when a predetermined maximum potential is applied between its said pair of terminals to render said first actuating means ineffective, and means energized as a consequence of the energization of said control network input terminals to maintain said valve conductive irrespective of the rendering of said first actuating means ineffective.

4. In a current inverting apparatus, a pair of power input terminals adapted to be connected to a source of unidirectional potential, a pair of power output terminals adapted to be connected to a load, an output capacitor, a first semiconductor device having a main power circuit and a control circuit, conductor means connecting said main power circuit and said capacitor in series between one of said input terminals and one of said output terminals, a second semiconductor device having a main power circuit and a control circuit, conductor means connecting said main circuit of said second device and said capacitor in series circuit between said output terminals, a first transformer having a primary and a secondary winding, a resonant circuit comprising an inductor and a capacitor and said primary winding, means connecting said resonant circuit in shunt with said second semiconductor device, a second transformer having a primary winding and a secondary winding, a third semiconductor device having a main circuit and a control circuit, means connecting said secondary winding of said first transformer and said primary winding of said second transformer and said main circuit of said third semiconductor device in series circuit, a voltage dividing network connected between said input terminals, means connecting said control circuit of said third semiconductor device across a first portion of said dividing network, a rectifier, means including said rectifier connecting said control circuit of said third semiconductor device to said secondary winding of one of said terminals of said second transformer, a voltage breakover semiconductor device, said breakover device acting substantially as an open circuit at voltages thereacross below a predetermined maximum breakover voltage and acting substantially as a closed circuit upon the occurrence of a voltage thereacross greater than said maximum voltage, said breakover device continuing to act substantially as a closed circuit until the current flow therethrough decreases below a predetermined minimum value, means connecting said breakover device in shunt circuit with a portion of said dividing network, said just named portion including at least a part of said first network portion, circuit means connecting a second of said secondary windings of said second transformer across said control circuit of said first semiconductor device, circuit means connecting a third of said secondary windings of said second transformer across said control circuit of said second semiconductor device, and conductor means connecting the other of said output and input terminals.

5. In a current inverting apparatus, a pair of power input terminals adapted to be connected to a source of unidirectional potential, a pair of power output terminals adapted to be connected to a load, an output capacitor, a first semiconductor device having a main power circuit and a control circuit, conductor means connecting said main power circuit and said capacitor in series between one of said input terminals and one of said output terminals, a second semiconductor device having a main power circuit and a control circuit, conductor means connecting said main circuit of said device and said capacitor in series circuit between said output terminals, a first transformer having a primary and a secondary winding, a resonant circuit comprising an inductor and a capacitor and said primary winding, means connecting said resonant circuit in shunt with said second semiconductor device, a second transformer having a primary winding and secondary windings, one of said secondary windings having end terminals and an intermediate terminal, a third semiconductor device having a main circuit and a control circuit, means connecting said secondary winding of said first transformer and said primary winding of said second transformer and said main circuit of said third semiconductor device in series circuit, a voltage dividing network connected between said input terminals, means connecting said control circuit of said third semiconductor device across a first portion of said dividing network, a plurality of rectifiers, means including one of said rectifiers connecting said control circuit of said third semiconductor device between said intermediate terminal and one of said end terminals of said second transformer secondary winding, means including a second of said rectifiers connecting the other of said end terminals to said intermediate terminal, a voltage breakover semiconductor device, said breakover device acting substantially as an open circuit at voltages thereacross below a predetermined maximum breakover voltage and acting substantially as a closed circuit upon the occurrence of a voltage thereacross greater than said maximum voltage, said breakover device continuing to act substantially as a closed circuit until the current flow therethrough decreases below a predetermined minimum value, means connecting said breakover device in shunt circuit with a portion of said dividing network, said just named portion including at least a part of said first network portion, circuit means connecting a second of said secondary windings of said second transformer across said control circuit of said first semiconductor device, circuit means connecting a third of said secondary windings of said second transformer across said control circuit of said second semiconductor device, and conductor means connecting the other of said output and input terminals.

6. In a current inverting apparatus, a pair of power input terminals adapted to be connected to a source of unidirectional potential, a pair of power output terminals adapted to be connected to a load, an output capacitor, a first semiconductor device having a main power circuit and a control circuit, conductor means connecting said main power circuit and said capacitor in series between one of said input terminals and one of said output terminals, a second semiconductor device having a main power circuit and a control circuit, conductor means connecting said main circuit of said second device and said capacitor in series circuit between said output terminals, a first transformer having a primary and a secondary winding, a resonant circuit comprising an inductor and a capacitor and said primary winding, means connecting said resonant circuit in shunt with said second semiconductor device, a second transformer having a primary winding and secondary windings, one of said secondary windings having end terminals and an intermediate terminal, a third semiconductor device having a main circuit and a control circuit, means connecting said secondary winding of said first transformer and said primary winding of said second transformer and said main circuit of said third semiconductor device in series circuit, a voltage dividing network connected between said input terminals, means connecting said control circuit of said third semiconductor device across a first portion of said dividing network, a plurality of rectifiers, means including one of said rectifiers connecting said control circuit of said third semiconductor device between said intermediate terminal and one of said end terminals of said second transformer secondary winding, means including a second of said rectifiers connecting said control circuit of said third semiconductor device between said intermediate terminal and the other of said end terminals, a voltage breakover semiconductor device, said breakover device acting substantially as an open circuit at voltages thereacross below a predetermined maximum breakover voltage and acting substantially as a closed circuit upon the occurrence of a voltage thereacross greater than said maximum voltage, said breakover device continuing to act substantially as a closed circuit until the current flow therethrough decreases below a predetermined minimum value, means connecting said breakover device in shunt circuit with a portion of said dividing network, said just named portion including at least a part of said first network portion, circuit means connecting a second of said secondary windings of said second transformer across said control circuit of said first semiconductor device, circuit means connecting a third of said secondary windings of said second transformer across said control circuit of said second semiconductor device, and conductor means connecting the other of said output and input terminals.

7. In a current inverting apparatus, a pair of power input terminals adapted to be connected to a source of unidirectional potential, a pair of power output terminals adapted to be connected to a load, an output capacitor, a first semiconductor device having a main power circuit and a control circuit, conductor means connecting said main power circuit and said capacitor in series between one of said input terminals and one of said output terminals, a second semiconductor device having a main power circuit and a control circuit, conductor means connecting said main circuit of said second devices and said capacitor in series circuit between said output terminals, a first transformer having a primary and a secondary winding, a resonant circuit comprising an inductor and a capacitor and said primary winding, means connecting said resonant circuit in shunt with said second semiconductor device, a second transformer having a primary winding and secondary windings, one of said secondary windings having end terminals and an intermediate terminal, a third semiconductor device having a main circuit and a control circuit, a full wave rectifying network having alternating current input connections and direct current output connections, means connecting said secondary winding of said first transformer and said primary winding of said second transformer and said alternating current input connections in series circuit, a rectifier device, means connecting said main circuit of said third semiconductor device and said rectifier device across said direct current output connections, a voltage dividing network connected between said input terminals, means connecting said control circuit of said third semiconductor device across a first portion of said dividing network, a plurality of rectifiers, means including one of said rectifiers connecting said control circuit of said third semiconductor device between said intermediate terminal and one of said end terminals of said second transformer secondary winding, means including a second of said rectifiers connecting said control circuit of said third semiconductor device between said intermediate terminal and the other of said end terminals, a voltage breakover semiconductor device, said breakover device acting substantially as an open circuit at voltages thereacross below a predetermined maximum breakover voltage and acting substantially as a closed circuit upon the occurrence of a voltage thereacross greater than said maximum voltage, said breakover device continuing to act substantially as a closed circuit until the current flow therethrough decreases below a predetermined minimum value, means connecting said breakover device in shunt circuit with a portion of said dividing network, said just named portion including as a portion thereof said first network portion, circuit means connecting a second of said secondary windings of said second transformer across said control circuit of said first semiconductor device, circuit means connecting a third of said secondary windings of said second transformer across said control circuit of said second semiconductor device, and conductor means connecting the other of said output and input terminals.

8. In an apparatus of the character described, a pair of semiconductor devices, each said device having a main current path and a control current path, a controlling network for alternately rendering said devices conducting, said network including a pair of alternating potential input terminals adapted to be energized from a source of alternating potential, said network further including a transformer and a semiconductor valve and a full wave rectifier, said transformer having a primary winding and a plurality of secondary windings, said rectifier having alternating current input terminals and direct current output terminals, said semiconductor valve having a main current path and a control current path, said primary winding being connected between one of said network input terminals and one of said rectifier input terminals, means connecting the other of said network input terminals to the other of said rectifier input terminals, means connecting said main path of said semiconductor across said rectifier output terminals, an impedance device having a plurality of terminals, means connecting said control path of said semiconductor valve between a first and a second of said terminals of said impedance device, a voltage breakover device, said breakover device acting substantially as an open switch at voltages thereacross below a predetermined critical value, said breakover device being rendered conductive as a consequence of the application of voltage thereacross in excess of said predetermined critical value to act substantially as a closed switch, said breakover device continuing to act as a closed switch until the current flow therethrough decreases below a predetermined minimum value, means connecting said breakover device between said first terminal and a third of said terminals of said impedance device, and means individually connecting said control paths of said semiconductor devices to said secondary windings.

9. In an apparatus of the character described, a pair of semiconductor devices, each said device having a main current path and a control current path, a controlling network for alternately rendering said devices conducting, said network including a pair of alternating potential input terminals adapted to be energized from a source of alternating potential, said network further including a transformer and a semiconductor valve and a full wave rectifier, said transformer having a primary winding and a plurality of secondary windings, said rectifier having alternating current input terminals and direct current output terminals, said semiconductor valve having a main current path and a control current path, said primary winding being connected between one of said network input terminals and one of said rectifier input terminals, means connecting the other of said network input terminals to the other of said rectifier input terminals, means connecting said main path of said semiconductor valve across said rectifier output terminals, an impedance device having a plurality of terminals, means connecting said control path of said semiconductor valve between a first and a second said terminals of said impedance device, a voltage breakover device, said breakover device acting substantially as an open switch at voltages thereacross below a predetermined critical value, said breakover device being rendered conductive as a consequence of the application of voltage thereacross in excess of said predetermined critical value to act substantially as a closed switch, said breakover device continuing to act as a closed switch until the current flow therethrough decreases below a predetermined minimum value, means connecting said breakover device between said first terminal and a third of said terminals of said impedance device, means individually connecting said control path of said semiconductor devices to said secondary windings, and a selectively actuable reset device for reducing current flow through said breakover device below said predetermined minimum value.

10. In an apparatus of the character described, a pair of semiconductor devices, each said device having a main current path and a control current path, a controlling network for alternately rendering said devices conducting, said network including a pair of alternating potential input terminals adapted to be energized from a source of alternating potential, said network further including a transformer and a semiconductor valve and a full wave rectifier, said transformer having a primary winding and a plurality of secondary windings, said rectifier having alternating current input terminals and direct current output terminals, said semiconductor valve having a main current path and a control current path, said primary winding being connected between one of said network input terminals and one of said rectifier input terminals, means connecting the other of said network input terminals to the other of said rectifier input terminals, means connecting said main path of said semiconductor across said rectifier output terminals, an impedance device having a plurality of terminals, means connecting said control path of said semiconductor valve between a first and a second of said terminals of said impedance device, a voltage breakover device, said breakover device acting substantially as an open switch at voltages thereacross below a predetermined critical value, said breakover device being rendered conductive as a consequence of the application of voltage thereacross in excess of said predetermined critical value to act substantially as a closed switch, said breakover device continuing to act as a closed switch until the current flow therethrough decreases below a predetermined minimum value, means connecting said breakover device between said first terminal and a third of said terminals of said impedance device, means individually connecting said control path of said semiconductor devices to said secondary windings, and a selectively actuable switch connected in shunt circuit with said breakover device for reducing the voltage across said breakover device below a value necessary to sustain said minimum current.

11. In an apparatus of the character described, a pair of semiconductor devices, each said device having a main current path and a control current path, a controlling network for alternately rendering said devices conducting, said network including a pair of alternating potential input terminals adapted to be energized from a source of alternating potential, said network further including a transformer and a semiconductor valve and a full wave rectifier, said transformer having a primary winding and a plurality of secondary windings, said rectifier having alternating current input terminals and direct current output terminals, said semiconductor valve having a main current path and a control current path, said primary winding being connected between one of said network input terminals and one of said rectifier input terminals, means connecting the other of said network input terminals to the other of said rectifier input terminals, means connecting said main path of said semiconductor valve across said rectifier output terminals, an impedance device having a plurality of terminals, means connecting said control path of said semiconductor valve between a first and a second of said terminals of said impedance device, a current controlling device connected between said first terminal and a third of said terminals of said impedance device, and means individually connecting said control path of said semiconductor devices to said secondary windings.

12. In an apparatus of the character described, a pair of semiconductor devices, each said device having a main current path and a control current path, a controlling network for alternately rendering said devices conducting, said network including a pair of alternating potential input terminals adapted to be energized from a source of alternating potential, said network further including a transformer and a semiconductor valve and a full wave rectifier, said transformer having a primary winding and a plurality of secondary windings, said rectifier having alternating current input terminals and direct current output terminals, said semiconductor valve having a main current path and a control current path, said primary winding being connected between one of said network input terminals and one of said rectifier input terminals, means connecting the other of said network input terminals to the other of said rectifier input terminals, means connecting said main path of said semiconductor across said rectifier output terminals, an impedance device having a plurality of terminals, means connecting said control path of said semiconductor valve between a first and a second of said end terminals of said impedance device, a normally non-conducting current controlling device connected between said first terminal and a third of said terminals of said impedance device, means individually connecting said control path of said semiconductor devices to said secondary windings, and a condition sensitive means operatively connected to said current controlling device for rendering said current controlling device conductive.

13. In an electrical inverting apparatus, first and second transistors, each said transistor having a main circuit and a control circuit, a pair of input terminals adapted to be supplied with direct potential energy, a pair of output terminals adapted to be connected to a load, a capacitor, means connecting said main circuit of said first transistor and said capacitor in series circuit between a first of said input and output terminals, means connecting said main circuit of said second transistor and said capacitor in series between said output terminals, means connecting a second of said input terminals to a second of said output terminals, a third transistor having a main circuit and a control circuit, control circuit means connected to said control circuits of said first and second transistors and including said main circuit of said third transistor, said control circuit means being effective upon conduction of said main path of said third transistor effective to alternately render one of said transistors conducting, means responsive to the conductive condition of said third transistor for maintaining said third transistor conducting, a second control circuit means connected to said control circuit of said third transistor and normally effective to maintain said main circuit of said third transistor conductive, and means for rendering said second control circuit ineffective.

14. In a current inverting apparatus, a pair of input terminals adapted to be energized from a source of unidirectional potential, a pair of output terminals adapted to be connected to an alternating potential load, an energy storage device, a first and a second semiconductor valve device, each said semiconductor devices having a main power path and a control path, means connecting said storage device between one of said input and output terminals and including said main path of said first semiconductor device, means connecting said storage device across said output terminals and including said main path of said second semiconductor device, means connecting together the other terminal of said input and output terminals, a control network having output terminals connected to said control paths of said semiconductor devices and having a pair of input terminals adapted to be energized with an alternating potential having the same frequency as the frequency of the energy supplied to said output terminals, said network including a third semiconductor valve device having a main power path and a control path, said network being so arranged that conduction of said main path of said third semiconductor device controls conduction through said main path of said first semiconductor device, a first energizable control circuit operatively connected to energize said control path of said third semiconductor device whereby said main path of said third semiconductor device is rendered conductive, a second control circuit energized as a consequence of current flow through said main path of said third semiconductor device, said second control circuit being connected to said control path of said third semiconductor device and effective when energized to energize said control path of said third semiconductor device whereby said main path of said third semiconductor device is maintained conductive, and means for deenergizing said first control circuit.

15. In a current inverting apparatus, a pair of input terminals adapted to be energized from a source of unidirectional potential, a pair of output terminals adapted to be connected to an alternating potential load, an energy storage device, a first and a second semiconductor valve device, each said semiconductor devices having a main power path and a control path, means connecting said storage device between one of said input and output terminals and including said main path of said first semiconductor device, means connecting said storage device across said output terminals and including said main path of said second semiconductor device, means connecting together the other terminal of said input and output terminals, a first transformer having a pair of windings, means connecting one of said windings in shunt relation with said second semiconductor device, a second transformer having a primary winding and a plurality of secondary windings, a third semiconductor device having a main power path and a control path, means connecting a second of said winding of said first transformer to said primary winding and including said main path of said third semiconductor device, means connecting a first of said secondary windings to said control path of said first semiconductor device, means connecting a second of said secondary windings to said control path of said second semiconductor device, an asymmetric current flow controlling device connected in shunt with said main path of said third semiconductor device and poled to conduct current in a direction opposite to current flow through said third device main path, said asymmetric device and said third semiconductor device being relatively poled such that current flow through said third semiconductor device initiates current flow through said first device and current flow through said asymmetric device initiates current flow through said second semiconductor device, first and second energizing circuits connected to said control path of said third semiconductor device, said first energizing circuit being effective in a first operating condition to render said main path of said third semiconductor device conductive, means for rendering said first energizing circuit into and out of said operating condition, means connecting said second energizing circuit to a third of said secondary windings for energization of said control circuit of said third semiconductor device as a consequence of the conduction of said main path of said third semiconductor device.

16. In a current inverting apparatus, a pair of input terminals adapted to be energized from a source of unidirectional potential, a pair of output terminals adapted to be connected to an alternating potential load, an energy storage device, a first and a second semiconductor valve device, each said semiconductor devices having a main power path and a control path, means connecting said storage device between one of said input and output terminals and including said main path of said first semiconductor device, means connecting said storage device across said output terminals and including said main path of said second semiconductor device, means connecting together the other terminal of said input and output terminals, a first transformer having a pair of windings, means connecting one of said windings in shunt relation with said second semiconductor device, a second transformer having a primary winding and a plurality of secondary windings, a third semiconductor device having a main power path and a control path, means connecting a second of said winding of said first transformer to said primary winding and including said main path of said third semiconductor device, means connecting a first of said secondary windings to said control path of said first semiconductor device, means connecting a second of said secondary windings to said control path of said second semiconductor device, an asymmetric current flow controlling device connected in shunt with said main path of said third semiconductor device and poled to conduct current in a direction opposite to current flow through said third device main path, said asymmetric device and said third semiconductor device being relatively poled such that current flow through said third semiconductor device initiates current flow through said first device and current flow through said asymmetric device initiates current flow through said second semiconductor device, an impedance element connected in series with said control path of said third semiconductor device, a first means for energizing said impedance element at a polarity to cause said main path of said third semiconductor to be rendered conductive, means connecting a third of said secondary windings across said impedance element, and means for rendering said first energizing means ineffective.

17. In a current inverting apparatus, a pair of input terminals adapted to be energized from a source of unidirectional potential, a pair of output terminals adapted to be connected to an alternating potential load, an energy storage device, a first and a second semiconductor valve device, each said semiconductor devices having a main power path and a control path, means connecting said storage device between one of said input and output terminals and including said main path of said first semiconductor device, means connecting said storage device across said output terminals and including said main path of said second semiconductor device, means connecting together the other terminal of said input and output terminals, a first transformer having a pair of windings, means connecting one of said windings in shunt relation with said second semiconductor device, a second transformer having a primary winding and a plurality of secondary windings, a third semiconductor device having a main power path and a control path, means connecting a second of said winding of said first transformer to said primary winding and including said main path of said third semiconductor device, means connecting a first of said secondary windings to said control path of said first semiconductor device, means connecting a second of said secondary windings to said control path of said second semiconductor device, an asymmetric current flow controlling device connected in shunt with said main path of said third semiconductor devce and poled to conduct current in a direction opposite to current flow through said third device main path, said asymmetric device and said third semiconductor device being relatively poled such that current flow through said third semiconductor device initiates current flow through said first device and current flow through said asymmetric device initiates current flow through said second semiconductor device, a pair of series connected impedance elements, means connecting one of said impedance elements in series with said control path of said third semiconductor device, a first means for energizing said series connected impedance elements at a polarity to cause said main path of said third semiconductor device to be rendered conductive, means connecting a third of said secondary windings across said one impedance element, and a breakdown device connected in shunt circuit with said series connected impedance elements.

18. In a current inverting apparatus, a pair of input terminals adapted to be energized from a source of unidirectional potential, a pair of output terminals adapted to be connected to an alternating potential load, an energy storage device, a first and a second semiconductor valve device, each said semiconductor devices having a main power path and a control path, means connecting said storage device between one of said input and output terminals and including said main path of said first semiconductor device, means connecting said storage device across said output terminals and including said main path of said second semiconductor device, means connecting together the other terminal of said input and output terminals, a first transformer having a pair of windings, means connecting one of said windings in shunt relation with said second semiconductor device, a second transformer having a primary winding and a plurality of secondary windings, a third semiconductor device having a main power path and a control path, means connecting a second of said winding of said first transformer to said primary winding and including said main path of said third semiconductor device, means connecting a first of said secondary windings to said control path of said first semiconductor device, means connecting a second of said secondary windings to said control path of said second semiconductor device, an asymmetric current flow controlling device connected in shunt with said main path of said third semiconductor device and poled to conduct current in a direction opposite to current flow through said third device main path, said asymmetric device and said third semiconductor device being relatively poled such that current flow through said third semiconductor device initiates current flow through said first device and current flow through said asymmetric device initiates current flow through said second semiconductor device, a pair of series connected impedance elements, means connecting one of said impedance elements in series with said control path of said third semiconductor device, a first means for energizing said series connected impedance elements at a polarity to cause said main path of said third semiconductor device to be rendered conductive, means connecting a third of said secondary windings across said one impedance element, a breakdown device connected in shunt circuit with said series connected impedance elements, and control means for varying the potential applied across said series connected impedance elements.

References Cited in the file of this patent

UNITED STATES PATENTS

| | | |
|---|---|---|
| 1,902,468 | Sabbah | Mar. 21, 1933 |
| 2,832,900 | Ford | Apr. 29, 1958 |
| 3,012,181 | Schultz | Dec. 5, 1961 |
| 3,046,412 | Seike | July 24, 1962 |